(12) United States Patent
Takagi et al.

(10) Patent No.: US 7,086,419 B2
(45) Date of Patent: Aug. 8, 2006

(54) COMPOSITE HOSE WITH A CORRUGATED METAL TUBE

(75) Inventors: Yuji Takagi, Komaki (JP); Minoru Hiramatsu, Kasugai (JP); Motoshige Hibino, Komaki (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 11/070,588

(22) Filed: Mar. 2, 2005

(65) Prior Publication Data
US 2005/0211323 A1 Sep. 29, 2005

(30) Foreign Application Priority Data
Mar. 29, 2004 (JP) ............... 2004-096857

(51) Int. Cl.
*F16L 11/00* (2006.01)
(52) U.S. Cl. ............... 138/121; 138/137; 138/139; 138/122; 138/143
(58) Field of Classification Search ............... 138/109, 138/121, 143, 122, 139, 137; 285/256, 258, 285/259, 903, 222.4, 222.5, 242, 382
See application file for complete search history.

(56) References Cited

U.S. PATENT DOCUMENTS

| | | | |
|---|---|---|---|
| 3,580,289 A * | 5/1971 | James et al. ............... | 138/121 |
| 4,369,992 A * | 1/1983 | Fournier et al. ............ | 285/256 |
| 4,384,595 A * | 5/1983 | Washkewicz et al. ....... | 138/127 |
| 4,429,290 A * | 1/1984 | Devan ........................ | 333/241 |
| 4,758,029 A * | 7/1988 | Davis ......................... | 285/253 |
| 5,601,893 A * | 2/1997 | Strassel et al. ............ | 428/35.9 |
| 6,354,332 B1 | 3/2002 | Burkhardt et al. .......... | 138/109 |
| 2004/0020545 A1 | 2/2004 | Takagi et al. ............... | 138/109 |

* cited by examiner

Primary Examiner—Patrick Brinson
(74) Attorney, Agent, or Firm—Andrus, Sceales, Starke & Sawall, LLP

(57) ABSTRACT

A composite hose is provided with a corrugated metal tube as a barrier layer against permeation of conveyed fluid, and an elastic filler layer which is filled in valley gaps between corrugation hills on an outer peripheral side of the corrugated metal tube. The elastic filler layer is filled completely in the valley gaps to tops of the corrugation hills. A radial thickness of the elastic filler layer measured radially outwardly from a radial position of the tops of the corrugation hills is designed 0.3 mm or less.

2 Claims, 8 Drawing Sheets

COMPOSITE HOSE WITH A CORRUGATED METAL TUBE

TECHNICAL FIELD

The present invention relates to a composite hose with a corrugated metal tube as a barrier layer against permeation of conveyed fluid, which is preferably usable for conveying fuel in automobiles, conveying refrigerant, conveying fuel of cell such as hydrogen gas used in a fuel cell or other applications.

BACKGROUND OF THE INVENTION

Typical rubber hoses, for example, made of a blend of acrylonitrile-butadiene rubber and polyvinyl chloride (NBR/PVC blend) which is excellent in resistance to gasoline permeability, have been used for conveying fuel (fuel such as gasoline for engine) for automobiles or the like in view of their high vibration-absorbability, easy assembling or the like. However, for the purpose of global environment protection, the regulations have been recently tighten against permeation of fuel for automobiles or the like, and are anticipated to be further tighten in the future. Therefore, such hoses for conveying fuel are required further permeation resistance to fuel.

And, hoses for conveying fuel such as hydrogen gas used in fuel cells, or for conveying carbon dioxide gas refrigerant are required extremely high permeation resistance to such conveyed fluid as hydrogen gas, carbon dioxide gas.

However, with regard to this requirement hoses configured by organic materials only such as rubber or resin are difficult to satisfy such required resistance.

Under the circumstances, it is considered to form preferably a composite hose by combining with a corrugated metal tube as a barrier layer against permeation of conveyed fluid.

For example, U.S. Pat. No. 6,354,332 discloses a composite hose with a corrugated metal tube of this type.

Meanwhile, a corrugated shape or a performance based on the shape provides a corrugated metal tube with an effect of flexibility. A material of the corrugated metal tube itself is metal and does not have elasticity different from rubber or the like.

So, a hose combined with a such corrugated metal tube involves a problem that during conveying fluid, an internal pressure is repeatedly exerted to the corrugated metal tube, the corrugated metal tube is deformed repeatedly in a radially expanding and contracting manner, and then a stress, which acts on the corrugated metal tube, brings a result that the corrugated metal tube is readily fatigue-broken at an early stage.

Specifically, when the corrugated metal tube expands radially, a maximum or large pulling stress or the largest pulling stress acts on corrugation hills. And, when it is repeated, the corrugation hills are readily cracked in a circumferential direction.

On the other hand, corrugation valleys are distorted and deformed while the corrugated metal tube expands and contracts radially. And, due to repeated distortion and deformation, the corrugation valleys are also readily cracked in a circumferential direction.

In the composite hose with a corrugated metal tube of this type which have been proposed traditionally, an elastic material such as rubber fills in valley gaps between corrugation hills on an outer peripheral side of the corrugated metal tube. The elastic material penetrating in the valley gaps as a result serve to restrain above deformation of the corrugation hills and the corrugation valleys of the corrugated metal tube.

However, in case of a conventional composite hose with a corrugated metal tube, the above-mentioned elastic material penetrating in the valley gaps are provided without an intention of restraining excessive deformation of the corrugation hills and valleys of a corrugated portion.

Then, the inventors of the present invention manufactured a sample of a composite hose with a corrugated metal tube where an elastic filler layer is provided to fill in valley gaps between corrugation hills on an outer peripheral side of the corrugated metal tube with an intention of restraining excessive deformation of the corrugated metal tube, specifically, of corrugation hills and valleys thereof, and evaluate the sample.

FIG. 7(.) shows one example thereof as comparison example.

With reference to FIG. 7(A), reference numeral 200 indicates a composite hose with a corrugated metal tube (hereinafter just referred to as a hose), which includes a corrugated metal tube 202 as an innermost layer by way of a barrier layer against permeation of conveyed fluid. A radial outer side of the corrugated metal tube 202 is laminated in sequence with a rubber filler layer 204, a first reinforcing layer 206, a middle rubber layer 208, a second reinforcing layer 210 and an outer surface rubber layer (cover rubber layer) 212.

Here, the first reinforcing layer 206 carries a function for pressure resistance when an internal pressure is exerted. The first reinforcing layer 206 is formed by braiding a reinforcing thread made of organic fiber, at a braid angle larger than a neutral angle (about 55°).

The first reinforcing layer 206 serves to restrain the hose 200 entirely from deforming in an expanding manner when an internal pressure is exerted.

The expansion restraint effect acts also on the corrugated metal tube 202. The first reinforcing layer 206 also serves to restrain the corrugated metal tube 202 from deforming in an expanding manner when an internal pressure exerted.

With reference to FIG. 7(B), reference numeral 214 indicates a corrugation hill of the corrugated metal tube 202, specifically of a corrugated portion thereof, reference numeral 216 indicates a corrugation valley thereof, and reference numeral 218 indicates a valley gap defined between adjacent corrugation hills 214, 214 on an outer peripheral side of the corrugated metal tube 202.

The above rubber filler layer 204 penetrates in the valley gaps 218, thereby serves to restrain deformation of the corrugated metal tube 202 in an expanding manner and excessive deformation of the corrugation hills 214 and the corrugation valleys 216.

So, as shown in FIG. 7(B), if no filler is filled in the valley gap 218 between the corrugation hills 214, 214 of the corrugated metal tube 202, and the valley gap 218 is vacant, the corrugated metal tube 202 is readily deformed and expands entirely in a diametrically expanding direction, when an internal pressure is exerted.

During that time, an excessive pulling stress acts on the corrugation hills 214, while the corrugation valleys 216 are largely distorted and deformed.

On the contrary, as shown in FIG. 7(C), if the valley gap 218 is filled with the rubber filler layer 204, such deformation is restrained. Owing to this restraint effect, it is prevented that the corrugation hills 214 are subject to the excessive pulling stress or the corrugation valleys 216 are excessively distorted and deformed. And, consequently, this prevents that the corrugated metal tube 202 is deformed excessively in an expanding manner and an excessive stress is generated in the corrugation hills 214 and the corrugation valleys 216. Hence, it was expected to cause no crack in the corrugated metal tube 202 at an early stage even when an internal pressure is exerted repeatedly to the corrugated metal tube 202 and consequently to improve durability of the corrugated metal tube 202.

However, a durability test (impulse test or impulse durability test) was conducted where an internal pressure is exerted to the hose 200 repeatedly at intervals, and it was found that the hose 200 does not necessarily have sufficient durability.

The cause of its insufficient durable life was pursued and turned out to be as follows. In the hose 200 as shown in FIG. 7(A), the rubber filler layer 204 is provided on an outer peripheral side of the corrugated metal tube 202 so as to have a certain radial thickness measured radially outwardly from a radial position of tops of the corrugation hills along an entire axial length of the corrugated metal tube 202 or a corrugated portion. So, expansion restraint effect of the first reinforcing layer 206 does not work on the corrugated metal tube 202 sufficiently and effectively. The corrugated metal tube 202 is deformed radially outwardly in an expanding manner, while the rubber filler layer 204 is elastically deformed. Then, due to this reason, the corrugated metal tube 202 comes to the end of its durable life and cracks at a relatively early stage when an internal pressure is exerted thereto repeatedly.

Contrary to the above as shown in FIG. 7(D), in case where whole amount of rubber content of the rubber filler layer 204 is small and this rubber filler layer 204 does not penetrate in the valley gaps 218 sufficiently, the corrugated metal tube 202 also does not have favorable durability.

The reason is that as space is left unfilled within the valley gaps 218 to receive rubber, the rubber is readily allowed to escape into unfilled space within the valley gaps 218, and the rubber filler layer 204 does not perform a sufficient function of restraining the corrugated metal tube 202 from being deformed.

The present invention is made under the foregoing circumstances. It is an object of the present invention to solve a problem that a corrugated metal tube is deformed excessively in radially expanding and contracting manner under an internal pressure exerted repeatedly, resulting in a fatigue crack initiation in the corrugated metal tube at an early stage, and to provide a composite hose with a corrugated metal tube having a favorable durable performance.

SUMMARY OF THE INVENTION

According to the present invention, there is provided a novel composite hose with a corrugated metal tube. The composite hose comprises a corrugated metal tube as a barrier layer against permeation of conveyed fluid, and an elastic filler layer which is filled in valley gaps between corrugation hills on an outer peripheral side of the corrugated metal tube. The elastic filler layer is filled completely in the valley gaps to tops of the corrugation hills. A radial thickness or a wall thickness of the elastic filler layer measured radially outwardly from a radial position of the tops of the corrugation hills, i.e., the radial thickness thereof measured radially outwardly at the tops of the corrugation hills or the radial thickness thereof at the tops of the corrugation hills 38 is designed 0.3 mm or less.

The elastic filler layer may be made of a nonfoamed material. The composite hose of the present invention further may comprise a reinforcing layer which is provided on a radially outer side of the corrugated metal tube directly or with intervening other layer. The reinforcing layer may be formed by braiding a reinforcing wire member or reinforcing filament member. A braid angle of the reinforcing layer may be larger or higher than a neutral angle.

As stated above, in the present invention, the elastic filler layer is filled completely in the valley gaps to tops of the corrugation hills, while a radial thickness or a wall thickness of the elastic filler layer measured radially outwardly from a radial position of the tops of the corrugation hills is designed 0.3 mm or less.

As already stated, if the elastic filler layer does not completely penetrate in the valley gaps defined between the corrugation hills, i.e., the elastic filler layer is not filled in the valley gaps to the tops of the corrugation hills, such elastic filler layer cannot accomplish sufficiently the function of restraining the corrugated metal tube, specifically the corrugation hills and the corrugation valleys from being deformed excessively, and consequently a fatigue crack initiates in the corrugated metal tube at an early stage.

The elastic filler layer is usually formed by extrusion of an elastic material at production of a hose. If an extruding amount of the elastic material is insufficient at an extruding operation, the elastic filler layer tends to incompletely fill in the valley gaps as stated above.

If the extruding amount is increased in order to prevent that, the radial thickness of the elastic filler layer measured radially outwardly from the radial position of the tops of the corrugation hills becomes necessarily large.

The most ideal radial thickness thereof measured radially outwardly from the radial position of the tops of the corrugation hills is zero, but it is difficult in view of production.

So, inventors of the present invention examined a relationship between the radial thickness of the elastic filler layer measured radially outwardly from the radial position of the tops of the corrugation hills and durability of a composite hose with a corrugated metal tube, more specifically the corrugated metal tube which is its weak point, and found that the composite hose with a corrugated metal tube may be provided with sufficient durability under repeated pressure by controlling the radial thickness 0.3 mm or less.

The present invention is made based on this finding.

Here, the above elastic filler layer is preferably a rubber filler layer.

In the present invention, the composite hose with a corrugated metal tube further may comprise a reinforcing layer which is provided on a radially outer side of the corrugated metal tube directly or with intervening other layer. The reinforcing layer may be formed by braiding or winding a reinforcing wire member, and a braid/winding angle thereof may be larger than a neutral angle. Thereby a large effect is provided on the composite hose with a corrugated metal tube.

The corrugated metal tube may have a straight-wall portion of straight tubular shape on an end portion of the corrugated metal tube, and a socket fitting is securely compressed, for example, on an end portion (outer periphery of the end portion) of the hose body, in a diametrically contracting direction so as to press the straight-wall portion radially inwardly. The socket fitting presses the straight-wall portion, for example, via the elastic filler layer, or the elastic filler layer and the reinforcing layer.

Now, the preferred embodiments of the present invention will be described in detail with reference to the drawings.

DETAILED DESCRIPTIONS OF PREFERRED EMBODIMENTS

Figure 1:
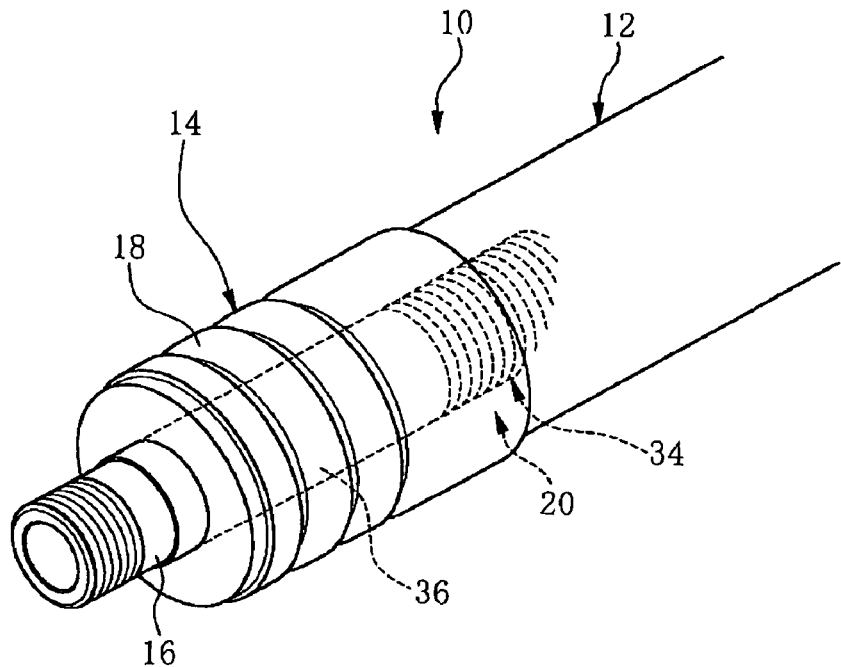
FIG. 1(A) is a perspective view of a composite hose with a corrugated metal tube of one embodiment according to the present invention.
FIG. 1(B) is a perspective view showing construction of the composite hose with a corrugated metal tube of FIG. 1(A).
Figure 1:
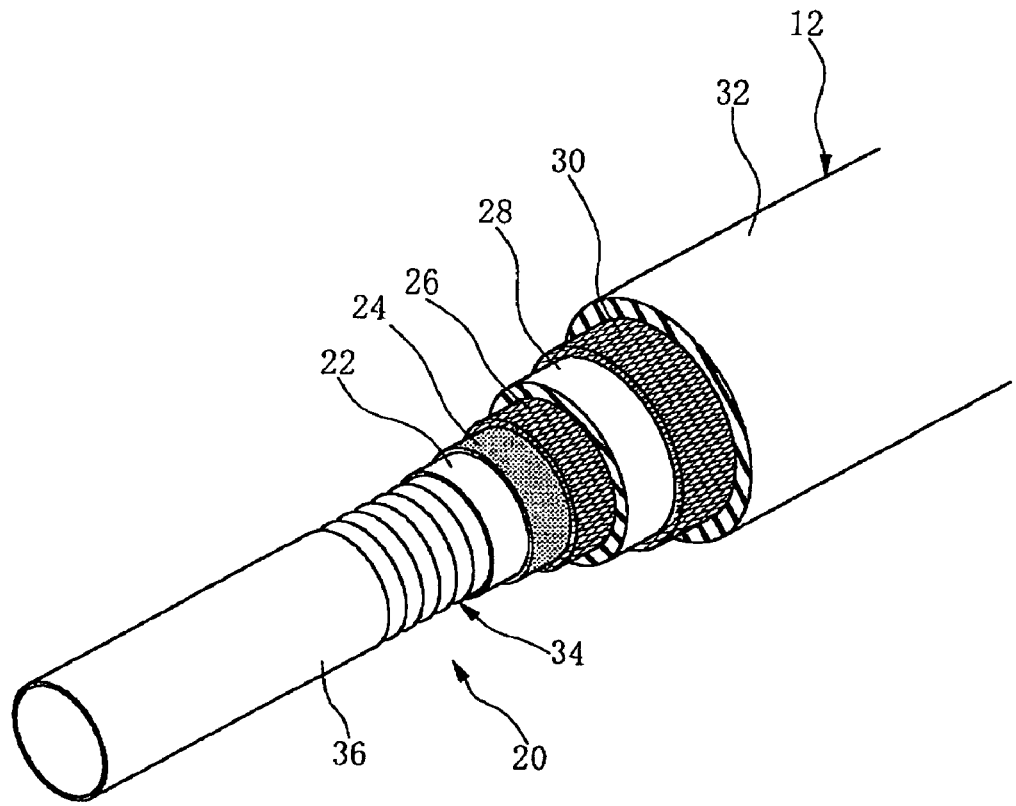
Figure 2:
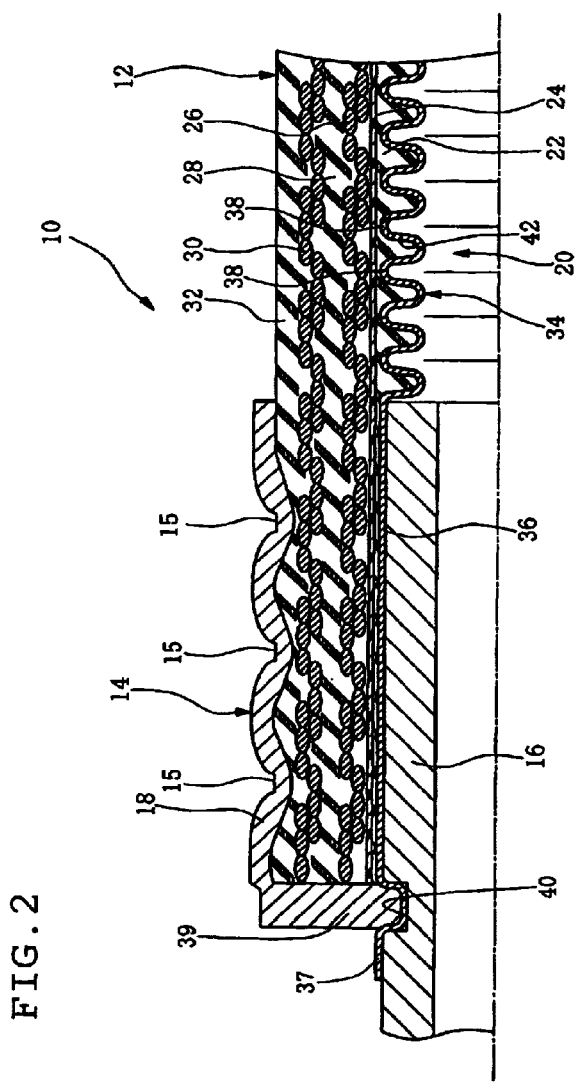
FIG. 2 is a cross-sectional view of the composite hose with a corrugated metal tube of FIG. 1(A).

In FIGS. 1 and 2, numeral reference 10 indicates a composite hose with a corrugated metal tube (hereinafter referred to just as a hose), numeral reference 12 a hose body, and numeral reference 14 a metal joint fitting attached on an end portion of the hose body 12. The joint fitting 14 has a metal insert fitting 16 like a pipe and a metal socket fitting 18 like a sleeve. The insert fitting 16 and the socket fitting 18 are fixedly secured on the end portion of the hose body 12 by securely compressing the socket fitting 18 onto the hose body 12 in a radially contracting direction.

The hose 10 has a corrugated metal tube 20 as an innermost layer. A radially outer side of the corrugated metal tube 20 is covered on laminated in sequence with a rubber filler layer 22 as an elastic filler layer, a hard resin layer 24, a first reinforcing layer 26, a middle rubber layer 28, a second reinforcing layer 30, and an outer surface rubber layer (cover rubber layer) 32 as an outermost layer.

The corrugated metal tube 20 has a corrugated portion 34 and a straight-wall portion or straight-walled portion 36 of straight tubular shape on an end portion of the corrugated metal tube 20. The above insert fitting 16 is inserted inside the straight-walled portion 36, while the socket fitting 18 is securely compressed onto the end portion of the hose body 12 (refer to reference numeral 15), where the straight-walled portion 36 is disposed as an innermost layer. So, the straight-walled portion 36 of the corrugated metal tube 20 is pressed in a diametrically contracting direction and held against or securely compressed onto the insert fitting 16 by the socket fitting 18 via outer layers, more specifically, the rubber filler layer 22, the hard resin layer 24, the first reinforcing layer 26, the middle rubber layer 28, the second reinforcing layer 30 and the outer surface rubber layer 32. Consequently, permeation resistance is ensured at a connected portion between the insert fitting 16 and the straight-walled portion 36. The straight-walled portion 36 includes an extending portion 37 which extends beyond an inwardly directed collar-like portion 39 of the socket fitting 18, axially outwardly from the outer layers. Here, the extending portion 37 is clamped between an inner end portion of the inwardly directed collar-like portion 39 of the socket fitting 18 and an annular groove 40 of the insert fitting 16. The extending portion 37 is pressed by the inwardly directed collar-like portion 39 and deformed along the annular groove 40.

The corrugated metal tube 20 of an innermost layer serves as a barrier layer against permeation of conveyed fluid, and is given flexibility by the corrugated portion 34.

Figure 3:
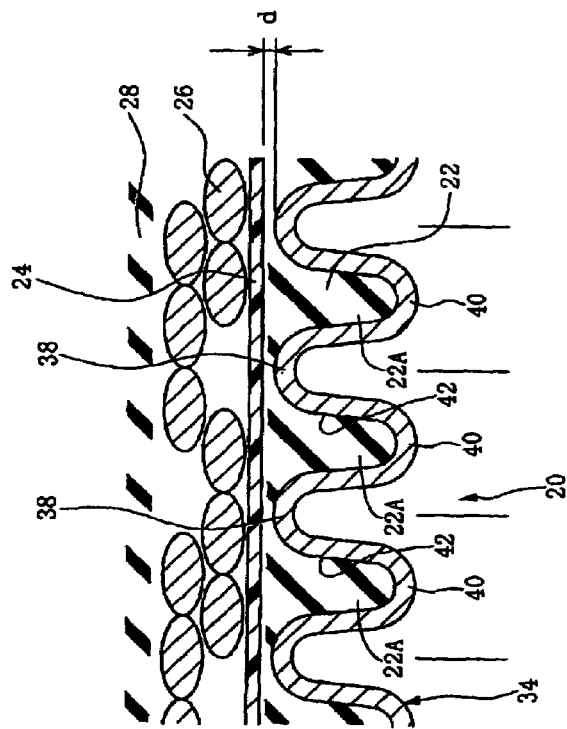
FIG. 3 is an enlarged sectional view of a relevant portion of FIG. 2.

The rubber filler layer 22 is a layer which penetrates in valley gaps 42 between adjacent corrugation hills 38, 38 of the corrugated portion 34 on an outer peripheral side thereof as shown in FIG. 3 in order to restrain the corrugated portion 34 from deformation in an expanding manner when an internal pressure is exerted to the corrugated portion 34. The rubber filler layer 22 is preferably a layer made of a solid rubber which is a nonfoamed material so as to have a major effect in restraining deformation in an expanding manner.

In this embodiment, the rubber filler layer 22 is filled completely in the valley gaps 42 to tops of the corrugation hills 38. A radial thickness or a wall thickness d of the rubber filler layer 22 measured radially outwardly from a radial position of the tops of the corrugation hills 38 of the corrugated portion 34, i.e., the radial thickness d of the rubber filler layer 22 which is defined between the tops of the corrugation hills 38 and the hard resin layer 24 or an inner peripheral surface of the hard resin layer 24, or the radial thickness d thereof at the tops of the corrugation hills 38 is designed 0.3 mm or less.

Figure 4:
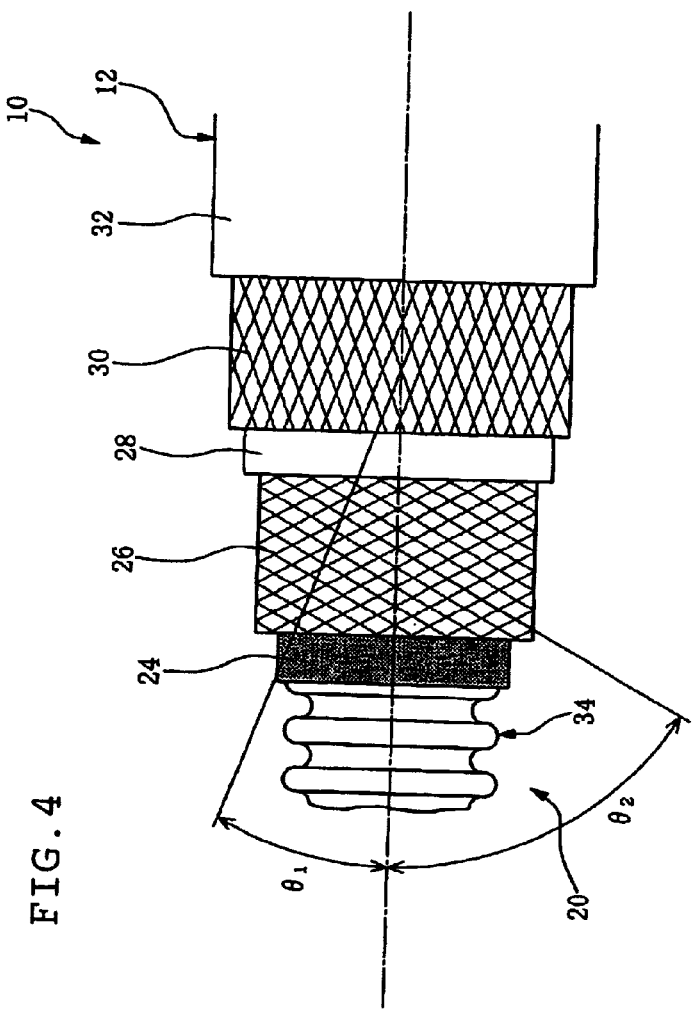
FIG. 4 is a view showing a braid angle of a reinforcing layer of the composite hose with a corrugated metal tube of FIG. 1(A).

Meanwhile, first and second reinforcing layers 26, 30 are provided to secure pressure resistance. Here, the first reinforcing layer 26 of these reinforcing layers is formed by braiding a reinforcing wire member or reinforcing filament member such as a reinforcing thread at a braid angle $\theta_2$ which is larger than a neutral angle (about 55°) as shown in FIG. 4.

On the other hand, here, the second reinforcing layer 30 on an outer side is formed by braiding a reinforcing wire member such as a metal wire at a braid angle $\theta_1$ which is smaller than the neutral angle.

And, the middle rubber layer 28 serves to restrain the first reinforcing layer 26 and the second reinforcing layer 30 from being displaced, for example, in a longitudinal direction, with respect to one another and being worn out, and to unify these layers. Further, the outer surface rubber layer 32 as an outermost layer serves to protect the second reinforcing layer 30.

Meanwhile, the hard resin layer 24 serves to enclose or confine the rubber filler 22A which is filled in the valley gaps 42 or gaps 42 between the corrugation hills 38, 38 on an outer peripheral side of the corrugated portion 34 within the valley gaps 42. Thus, the rubber filler 22A is prevented from escaping out of the valley gaps 42 radially outwardly when the corrugated metal tube 20 is deformed.

In this embodiment, the first reinforcing layer 26 is laminated and formed directly on an outer surface of the resin layer 24.

Here, a rubber layer may be interposed between the resin layer 24 and the first reinforcing layer 26. However, in the case where the first reinforcing layer 26 is braided or wound directly on an outer surface of the resin layer 24, direct contact is defined between the resin layer 24 and the first reinforcing layer 26. When the resin layer 24 and the first reinforcing layer 26 contact directly with one another, the first reinforcing layer 26 can effectively restrain radial change of the resin layer 24.

The above corrugated metal tube 20 preferably has a wall thickness of 0.5 mm or less in view of flexibility and elasticity required.

On the other hand, in view of workability or processability of a metal tube, a wall thickness of the corrugated metal tube 20 is preferably 0.1 mm or larger.

The corrugated metal tube 20 here has a single-layer construction. And, besides, the corrugated metal tube 20 may have a multilayer construction.

And, as for material of the corrugated metal tube 20, stainless steel, iron and steel, aluminum or aluminum alloy, copper or copper alloy, nickel or nickel alloy, titanium or titanium alloy, or the like may be used. The material of the corrugated metal tube 20 may be selected properly from these metals in view of resistance to conveyed fluid, durability against vibration/pressure, workability of a metal tube, or the like. Specifically, stainless steel is preferably used.

Then, the first reinforcing layer 26 and/or the second reinforcing layer 30 may be omitted in such case that an internal pressure exerted is low during conveying fluid and so on. However, generally, it is preferred to provide these reinforcing layers in order to secure pressure resistance.

In this embodiment, the first reinforcing layer 26 and the second reinforcing layer 30 are formed by winding or braiding a reinforcing wire member at density of 80% or less, namely a winding or braiding density of 80% or less and thereby favorable flexibility is secured over the reinforcing layers themselves.

As for reinforcing wire members of the first reinforcing layer 26 and the second reinforcing layer 30, usable are reinforcing threads formed from organic fiber, and as for material or raw material for the reinforcing wire members, usable are various other materials. According to need, metal wire members may be used.

The above middle rubber layer 28 may have a wall thickness of an range between 0.1 mm and 5.0 mm. However, the wall thickness of the middle rubber layer 28 is preferably between 0.1 mm and 0.5 mm in view of wear prevention and unification for the first reinforcing layer 26 and the second reinforcing layer 30.

And, the middle rubber layer 28 itself may have a multilayer construction.

Materials for the middle rubber layer 28 and the rubber filler layer 22 are selected properly in view of adhesiveness to an adjacent layer, flexibility, resistance to service conditions (external liquid or mechanical shock) etc., workability, or the like.

For example, the material for the middle rubber layer 28 and the rubber filler layer 22 may be selected properly from natural rubber type, styrene-butadiene rubber type, butadiene rubber type, isoprene rubber type, chloroprene rubber type, butyl rubber type, nitrile rubber type, ethylene-propylene rubber type, acrylic rubber type, urethane rubber type, silicon rubber type, fluorocarbon rubber type, polysulfide rubber type, epichlorohydrin rubber type, propylene oxide rubber type, alfin rubber type or the like. And, Hypalon (trademark of Dupont) rubber type may be also selected.

As the case may be, other elastic materials than rubber such as thermoplastic elastomer may be used to form the rubber filler layer 22 and the middle rubber layer 28.

The outer surface rubber layer 32 may be omitted depending on service conditions. However, the outer surface rubber layer 32 is preferably provided in view of protecting the corrugated metal tube 20, reinforcing layers such as the first reinforcing layer 26 and the second reinforcing layer 30 from external liquid, mechanical shock or the like. The outer surface rubber layer 32 preferably has a wall thickness of about 0.2 mm to 2.0 mm.

A material for the outer surface rubber layer 32 is selected properly in view of adhesiveness to an adjacent layer, flexibility, resistance to service conditions (external liquid or mechanical shock) etc., workability, or the like.

For example, the material for the outer surface rubber layer 32 may be selected properly from natural rubber type, styrene-butadiene rubber type, butadiene rubber type, isoprene rubber type, chloroprene rubber type, butyl rubber type, nitrile rubber type, ethylene-propylene rubber type, acrylic rubber type, urethane rubber type, silicon rubber type, fluorocarbon rubber type, polysulfide rubber type, epichlorohydrin rubber type, propylene oxide rubber type, alfin rubber type or the like. And, Hypalon (trademark of Dupont) rubber type may be also selected.

And, as the case may be, other materials than rubber such as thermoplastic elastomer may be used to form the outer surface rubber layer 32.

In order to accommodate the functionality needs, the above hard resin layer 24 preferably has such rigidity as not to allow its deformation under a stress which is generated by an internal pressure in the hose, and a wall thickness required for that. In that sense, the hard resin layer 24 may preferably have a wall thickness of 0.15 mm or larger.

On the other hand, if too large wall thickness thereof increases rigidity of the hose entirely and thereby impairs flexibility of the hose entirely. Therefore, preferably a maximum of the wall thickness of the resin layer 24 is 0.30 mm.

As for material for the hard resin layer 24, usable is resin such as an alloy material of polyamide-6 (PA6) and ethylene-propylene diene rubber (EPDM), polyethylene (PE), polypropylene (PP), PA6, polyamide-11 (PA11), polyamide-12 (PA12), polyethylene terephthalate (PET), polybutylene terephthalate (PBT), polybuthylene naphthalate (PBN), polyvinylidene fluoride (PVDF), ethylene-tetrafluoroethylene copolymer (ETFE), polytetrafluoroethylene (PTFE), polyphnylene sulfide (PPS), acrylonitrile-butadiene-styrene copolymer (ABS), polyethylene-vinyl acetate (EVA) or the like.

EXAMPLE

Figure 5:
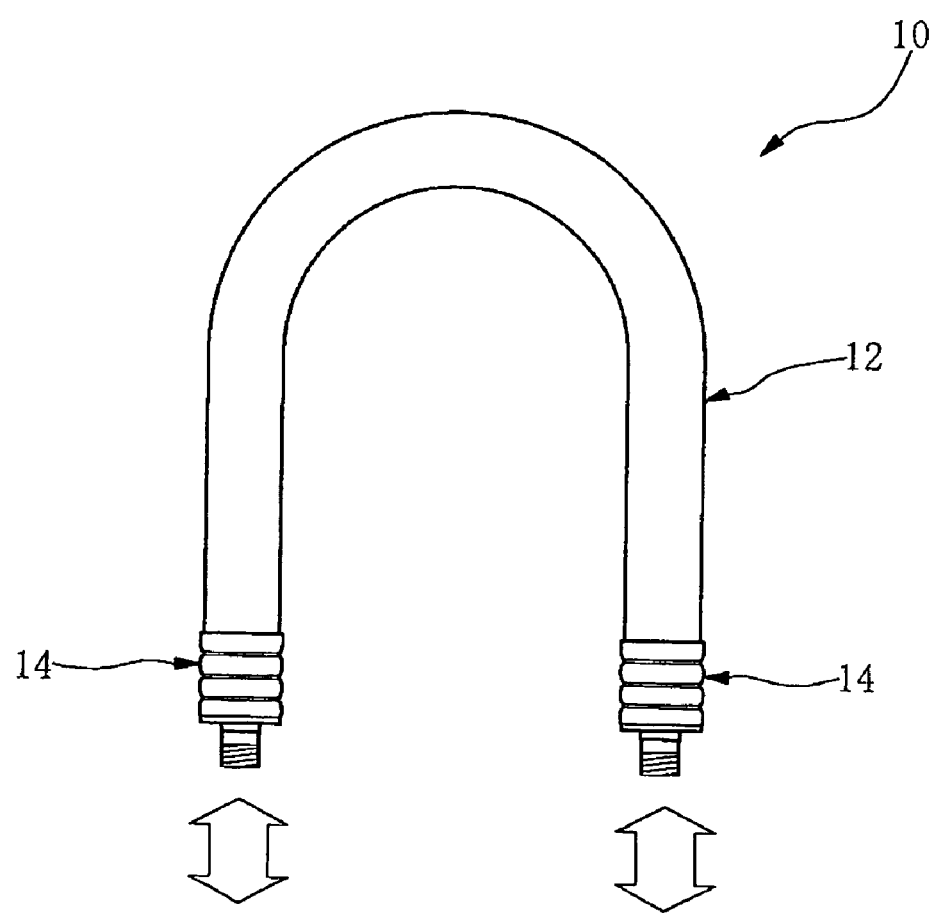
FIG. 5 is a view showing a bending shape of a composite hose with a corrugated metal tube in a durability test.

Samples including comparison samples regarding the composite hose with a corrugated metal tube 10 constructed as shown in Table 1 are produced. Then an impulse test (pressure cycle repetition test) was conducted as a durability test on the samples which were bent in U-shape in a manner shown in FIG. 5 by exerting an internal pressure thereto repeatedly under the following conditions.

In the samples, a wall thickness of the rubber filler layer 22 varies from 1.0 mm to 0.3 mm. Here, the wall thickness of the rubber filler layer 22 means a radial thickness measured radially outwardly from a radial position of tops of the corrugation hills 38.

Figure 6:
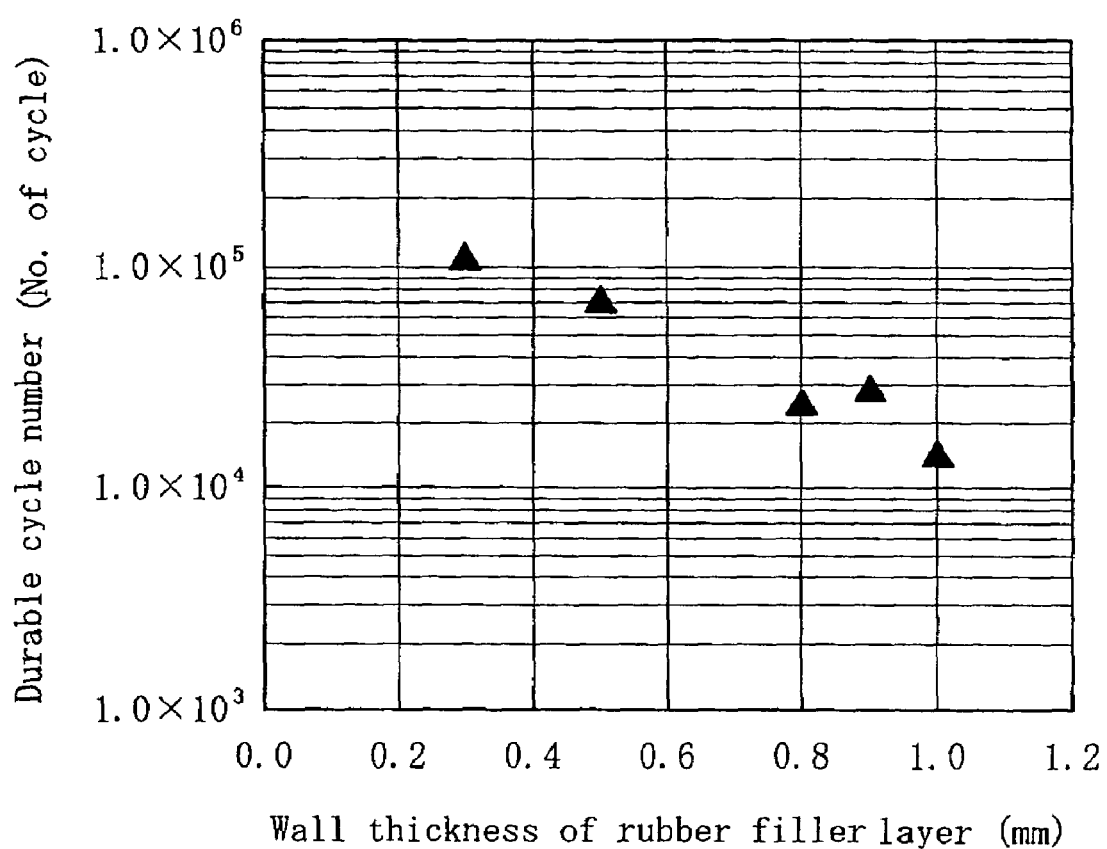
FIG. 6 is a view showing a relationship between a wall thickness of a rubber filler layer and durability of a composite hose with a corrugated metal tube.
Figure 7A:
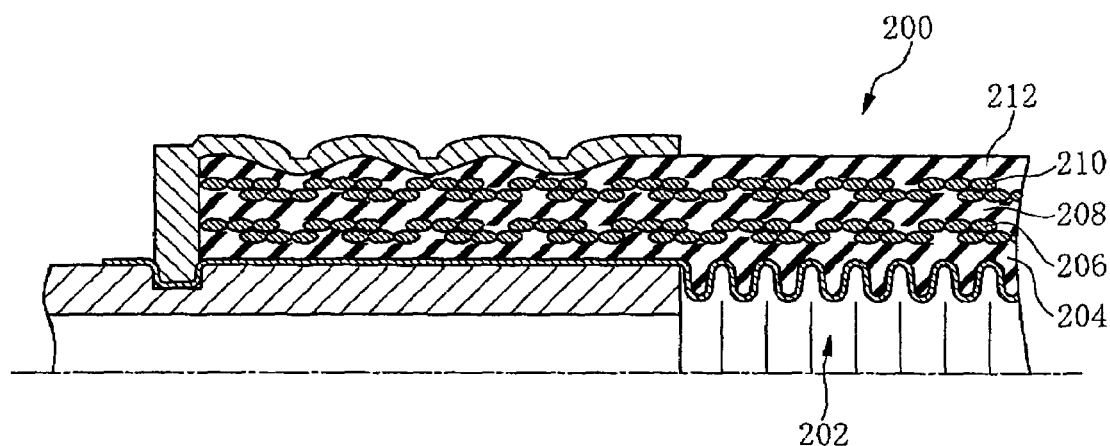
FIG. 7(A) is a view of a comparison example of a composite hose with a corrugated metal tube.
Figure 7B:
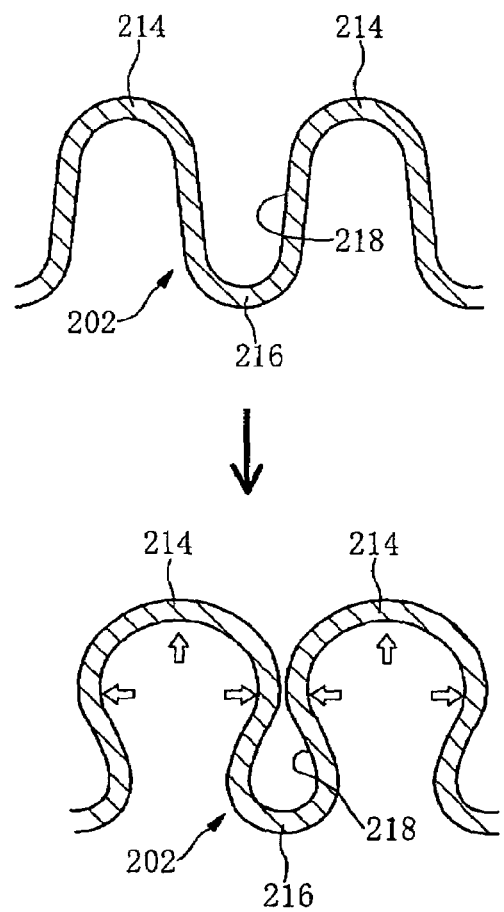
FIG. 7(B) is a view showing a deformation state of a composite hose with a corrugated metal tube having no filler layer.
Figure 7C:
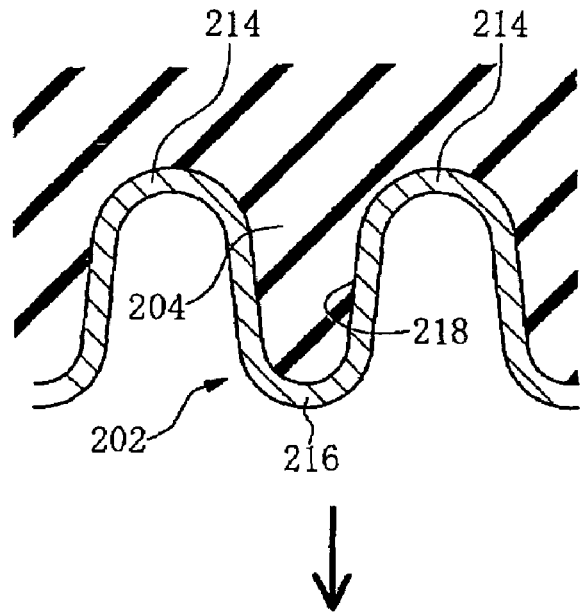
FIG. 7(C) is a view showing a deformation state of the composite hose with a corrugated metal tube of FIG. 7(A).
Figure 7C:
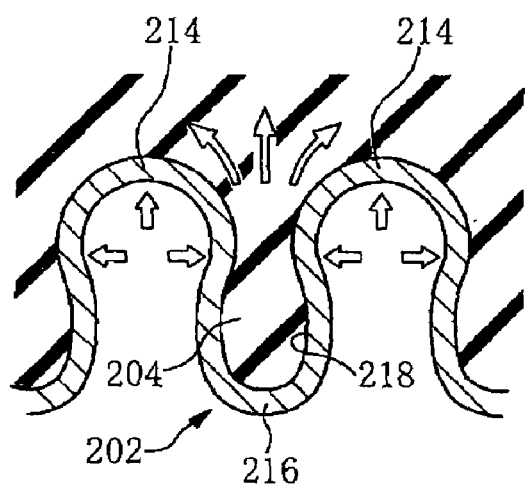
Figure 7D:
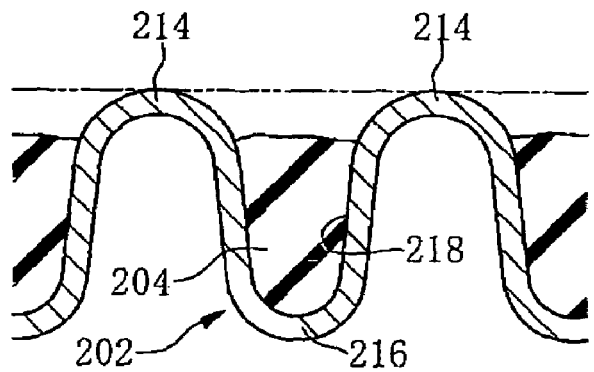
FIG. 7(D) is a view showing that a rubber filler layer penetrates in valley gaps insufficiently.

The results are shown in Table 2 and FIG. 6.

<Conditions of the Durability Test>

Bend R (radius): 70 mm

Temperature: 130° C.

Pressure: 0<=>22.5 Mpa

Frequency (pressure cycle repetitions/minute): 30 cpm

TABLE 1

Constructions of the sample hoses

| | Material | Wall thickness, etc. |
|---|---|---|
| Corrugated metal tube | SUS304 | t = 0.23 mm |
| Rubber filler layer | EPDM | t = 0.3 mm to 1.0 mm (on condition that the rubber filler layer is filled sufficiently in valley gaps) |
| Resin layer | ST811(alloy of PA6/EPDM) | t = 0.2 mm |
| First reinforcing layer | Aramid | Braid angle 64° |
| Middle rubber layer | EPDM | t = 0.5 mm |
| Second reinforcing layer | Diameter 0.2 wire | Braid angle 32° |
| Outer surface rubber layer | EPDM | t = 1.0 mm |

TABLE 2

Wall thickness of the rubber filler layer and durable cycle number

| Wall thickness of the rubber filler layer (mm) | Durable cycle number (No. of cycle) |
|---|---|
| 1.0 | 14341 |
| 0.8 | 24784 |
| 0.9 | 28638 |
| 0.5 | 72146 |
| 0.3 | 111646 |

As apparent from the test results, when the radial thickness of the rubber filler layer 22 measured radially outwardly from the radial position of the tops of the corrugation hills 38 is larger than 0.3 mm, the durable cycle number (the number of cycles up to a fatigue crack initiation) does not reach a target number of 100,000 cycles. However, the sample of the hose with a corrugated metal tube 10 having the radial thickness of the rubber filler layer 22 of 0.3 mm according to the present invention achieves a durability in which the durable cycle number exceeds the target number of 100,000 cycles, and exhibits a favorable durability.

Here, the corrugated metal tube 20 is restrained from deformation in an expanding manner by decreasing the radial thickness of the rubber filler layer 22 which is a cause of deformation of the corrugated metal tube 20 in an expanding manner, and as a result, there is provided an effect of enhancing the durability of the composite hose with a corrugated metal tube.

While the present invention has been described in terms of preferred embodiments, it is to be understood that these are presented only for the purpose of illustration. The present invention can be embodied by a variety of modifications without departing from the scope of the invention.

What is claimed is:

1. A composite hose, comprising:
a corrugated metal tube that is unitary in construction and provides a continuous barrier layer against permeation of conveyed fluid;
an elastic filler layer filled in valley gaps between corrugation hills on an outer peripheral side of the corrugated metal tube;
the elastic filler layer being filled completely in the valley gaps to tops of the corrugation hills, a radial thickness of the elastic filler layer measured radially outwardly from a radial position of the tops of the corrugation hills being 0.3 mm or less; and
a reinforcing layer provided on a radially outer side of the corrugated metal tube directly or with intervening other layer, the reinforcing layer being a braided reinforcing wire member, and a braid angle of the reinforcing layer being larger than a neutral angle.

2. The composite hose of claim 1, further comprising:
a second reinforcing layer provided on a radially outer side of the reinforcing layer, the second reinforcing layer comprising a braided reinforcing wire member; and
an intervening rubber layer disposed between the reinforcing layer and the second reinforcing layer, the rubber layer having a wall thickness of between 0.1 mm and 0.5 mm.

* * * * *